United States Patent
Johnston et al.

(10) Patent No.: US 6,199,199 B1
(45) Date of Patent: Mar. 6, 2001

(54) PRESENTATION OF VISUAL PROGRAM PERFORMANCE DATA

(75) Inventors: Gary Martin Johnston, Durham, NC (US); Mila Keren, Nesher (IL); Anthony Hayden Lindsey, Fuquay Varina, NC (US); Yael Shaham-Gafni, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/154,121

(22) Filed: Sep. 16, 1998

(51) Int. Cl.[7] .................................................. G06F 9/45
(52) U.S. Cl. ........................... 717/4; 717/1; 714/25; 345/339
(58) Field of Search .................................... 395/701, 709; 717/4, 1; 345/966, 339; 714/25; 703/22

(56) References Cited

U.S. PATENT DOCUMENTS

| | | | |
|---|---|---|---|
| 4,034,353 | * 7/1977 | Denny et al. | 345/440 |
| 4,845,615 | * 7/1989 | Blasciak | 714/10 |
| 5,388,268 | * 2/1995 | Beach et al. | 717/4 |
| 5,485,574 | * 1/1996 | Bolosky et al. | 714/35 |
| 5,530,942 | * 6/1996 | Tzou et al. | 707/512 |
| 5,748,881 | * 5/1998 | Lewis et al. | 714/47 |
| 5,881,268 | * 3/1999 | McDonald et al. | 703/21 |
| 5,926,176 | * 7/1999 | McMillan et al. | 717/4 |
| 5,961,596 | * 10/1999 | Takubo et al. | 709/224 |

OTHER PUBLICATIONS

Zhang et al.; "System Support for Automatic Profiling and Optimization". ACM Digital Library[online], Proceedings of the sixteenth ACM symposium on Operating systems principles, Oct. 1997.*

Conte et al.; "Using Branch Handling Hardware to Support Profile–Driven Optimization". ACM Digital Library[online], Proceedings of the 27th annual international symposium on Microarchitecture, Nov. 1994.*

Microsoft Corporation; Microsoft Visual C++ Development System for Windows: Professional Tools User's Guide. U.S.A., Microsoft Corporation, 1993.*

* cited by examiner

Primary Examiner—Mark R. Powell
Assistant Examiner—Kelvin Booker
(74) Attorney, Agent, or Firm—Gregory M. Doudnikoff; Marcia L. Doubet

(57) ABSTRACT

A method, system, and computer program for presenting runtime performance data for analysis in a visual programming environment. The performance data is presented in substantially the same manner in which a visual programmer creates a visual program. A number of alternative presentation styles are defined whereby the visual program is augmented to indicate performance data. For example, when displaying connections, one color may be used when displaying a connection to indicate it has been executed a relatively high number of times, while a different color (or a different hue of the first color) is used for connections that were executed a relatively low number of times. Or, different line styles may be used (such as different degrees of line thickness, or solid lines compared to lines comprised of dashes of varying length) may be used to represent the same information. Alternatively, the performance data may be indicated by annotating the graphical representation of the visual program with text (indicating the number of times the connection was executed, for example). Total and local elapsed time will also be presented, using the same presentation techniques. Both the execution counts and the elapsed time may be indicated in actual numbers, or as a percentage of the corresponding totals.

27 Claims, 15 Drawing Sheets

PRESENTATION OF VISUAL PROGRAM PERFORMANCE DATA

CROSS REFERENCES TO RELATED INVENTIONS

This application is related to U.S. patent application Ser. No. 09/154,127 entitled "A Technique for Test Coverage of Visual Programs "; U.S. patent application Ser. No. 09/154,231 entitled "Presentation of Visual Program Test Coverage Information "; and U.S. patent application Ser. No. 09/154,126 entitled "Visual Program Runtime Performance Analysis", all assigned to the International Business Machines Corporation (IBM) and filed concurrently herewith.

BACKGROUND OF THE INVENTION

1. Field of the Invention

The present invention relates to computer software, and deals more particularly with a method, system, and computer program for presenting runtime performance data for analysis in a visual programming environment. The information is presented in the same general visual manner in which a visual programmer creates a visual program. A number of alternative presentation styles are defined.

2. Description of the Related Art

In evaluating and optimizing computer programs, it is desirable to obtain performance information from the actual execution of the program, such as information about the time required for executing different parts of the program, or the number of times specific parts of the code are executed. "Performance monitoring" is concerned with monitoring execution dynamics of the software under situations that simulate, as nearly as practical, the actual operating environment in which the software is intended to run. The data gathered during this monitoring, or tracing, is then analyzed to locate the corresponding places in the code that form bottlenecks. Analysis of the code can then be made, with the goal of changing the program in some way to alleviate the performance problems. Additionally, the data gathered during performance monitoring may indicate those places in the code where a significant amount of overall execution time occurred. The programmer can then analyze (and possibly modify) that code to ensure that it is performing acceptably.

Performance monitoring is often referred to equivalently as performance benchmarking or performance testing, because the execution that simulates the actual operating environment is a "test" of the program's execution characteristics. The analysis process may also be referred to as performance tuning, although performance tuning is a broader term which encompasses the notion of changing the code, or "tuning" it, in an attempt to improve performance. For ease of reference, the term "performance analysis" will be used hereinafter as a shorthand for "performance monitoring and analysis", unless otherwise stated.

Performance analysis may focus on a number of different aspects of program execution. Some execution characteristics are user-oriented, while others are system-oriented. As an example of the former, response time may be measured, where the time that elapses between a user's request and the program's response to the user is calculated for purposes of comparing it to what a user may consider "acceptable". System-oriented characteristics are concerned with whether the system resources, such as the central processing unit and main storage, are being used efficiently.

Many techniques and tools exist today for monitoring the execution dynamics of programs written using conventional programming languages. Two common techniques are: (1) tracing, which gathers data (e.g. elapsed execution time, and execution counters) each time a function (or procedure, equivalently) is called; and (2) profiling, which uses periodic sampling of the execution stack to determine an estimate of what percentage of the execution time was spent in each function (or how many times it was executed). Both of these techniques are concerned with conventional textual code elements. However, component-based visual programs are different from conventional programs in several important ways. Because of these differences, known performance monitoring and analysis techniques cannot be applied to this new programming domain in a way that provides meaningful results. (The term "visual program" is used herein as a shorthand for "component-based visual program".)

A first difference between visual programs and conventional programs relates to the types of building blocks used by a programmer in creating a program, and a second difference lies in the source of those building blocks. Visual programs are graphically constructed primarily from pre-built components, equivalently referred to as "parts", which are typically supplied (along with the code which implements those components) by the vendor of the visual programming environment (or by a third-party vendor of such parts). Examples of visual programming environments are VisualAge for Java and VisualAge Smalltalk, from the International Business Machines Corporation ("IBM"). VisualAge is a registered trademark of IBM, and Java is a trademark of Sun Microsystems, Inc. A conventional programmer, on the other hand, typically writes program code himself using textual source-code statements of a programming language such as the C language. The source code statements specify data definition, as well as all operations on the data that are required in order to achieve the desired end result. Alternatively, in an object-oriented programming environment, the object-oriented programmer writes programs in a programming language such as Smalltalk, by creating or re-using objects and methods. Because the object-oriented programmer writes programs using textual source language coding statements, object-oriented programming will be considered as a "conventional" programming environment for purposes of the present invention.

The visual programmer writes a program by selecting from the pre-built components (often by selecting visual representations of these components), and specifying how, and in what sequence, the selected components will interact. The visual programming environment software then generates executable code that creates runtime objects that will implement the specified interactions. This generated code is constructed by the visual programming environment, and the visual programmer may have no idea of the performance implications of invoking/using this code. Further, because this generated code is created automatically by the programming environment, the programmer may raise support and warranty issues by altering it for tuning performance. In addition, because visual programs are written using components and interactions, profiling information expressed in terms of the number of calls to various functions, or the amount of execution time spent in each, does not provide useful information to the visual programmer. And, if profiling information expressed in these terms indicates inefficiencies, there is no correlation to the components and/or interactions that are the ones needing performance tuning. Finally, showing the visual programmer performance data in terms of the underlying code requires him to work at a different level (i.e. generated text, using source code in a programming language such as C or Smalltalk) during performance analysis than that in which he worked while programming (i.e. visually, using parts and interactions), which may be confusing, error prone, and inefficient.

End-users often complain about the performance of programs written using visual programming development environments. One of the main reasons for performance problems in these programs is that the programmer is usually oblivious to the performance implications of the programs he creates. The visually-created program may perform, under the covers, actions that are time-consuming, and which could have been optimized (or avoided) if the programmer had known about them. Consultants are often called in to assist programmers in performance tuning of their visually-created applications, increasing the overall cost of those applications. Because tools adapted to the special characteristics of the visual programming environment are not currently available to these consultants, an inordinate amount of time is expended in the tuning process. By providing a technique that allows tracing and analyzing these visually-created programs, program performance can be improved effectively and efficiently, reducing the time and expense involved. This, along with the improved program performance, will greatly increase the acceptance of visually-created programs by end-users.

Accordingly, what is needed is a technique for analyzing the runtime performance characteristics of visual programs, and presenting the performance data in a manner that is useful to the visual programmer. The technique for analyzing runtime performance data is the subject of the related invention having Ser. No. 09/154,126, titled "Visual Program Runtime Performance Analysis", which is incorporated herein by reference. This technique accounts for the specialized nature of visual programs, which are typically created by graphically specifying interactions between pre-built components. The execution information gathered during this process provides information that is useful to the programmer working in the visual programming environment, indicating performance data in terms of elements that correspond to a visual program. There is a need to present this performance data in the same general visual manner in which the visual program was created, so that the visual programmer can analyze the performance of the visual program conveniently, seeing the information in a program view with which he is already familiar.

SUMMARY OF THE INVENTION

An object of the present invention is to provide a technique for presenting runtime performance data for a visual program in a manner that is familiar to the visual programmer.

Another object of the present invention is to provide this technique by presenting performance data using substantially the same view used by the programmer for creating a visual program.

Yet another object of the present invention is to present performance data by augmenting the visual program view with additional information.

It is another object of the present invention is to provide this additional information using color, line thickness, line style, added text, or other graphical representations.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for presenting runtime performance data in a computing system having a capability for visual programming. This technique comprises: constructing a view of a selected one of one or more visually-created programs, wherein each of the programs comprises a plurality of elements; and augmenting the constructed view to indicate the performance data. Preferably, this constructing further comprises obtaining all of the elements, and the augmenting further comprises visually indicating element performance data for one or more of the elements. In one aspect, the visually indicating further comprises using a first color for each of the elements having the element performance data in a first category, and one or more other colors for each of the elements having the element performance data in one or more other categories. In another aspect, the visually indicating further comprises using a first line style for each of the elements having the element performance data in a first category, and one or more other line styles for each of the elements having the element performance data in one or more other categories. In a further aspect, the visually indicating further comprises using a first line thickness for each of the elements having the element performance data in a first category, and one or more other line thicknesses for each of the elements having the element performance data in one or more other categories. In yet another aspect, the visually indicating further comprises using a first hidden status for each of the elements having the element performance data in a first category, and a second hidden status for each of the elements having said element performance data not in the first category. In another aspect, the visually indicating further comprises annotating each of the elements with a textual indication of the element performance data. Preferably, the element performance data is obtained from stored information containing indicators for each of the elements which indicate a total execution time, a local execution time, and an execution count for the element.

The present invention will now be described with reference to the following drawings, in which like reference numbers denote the same element throughout.

DESCRIPTION OF THE PREFERRED EMBODIMENT

Figure 1:
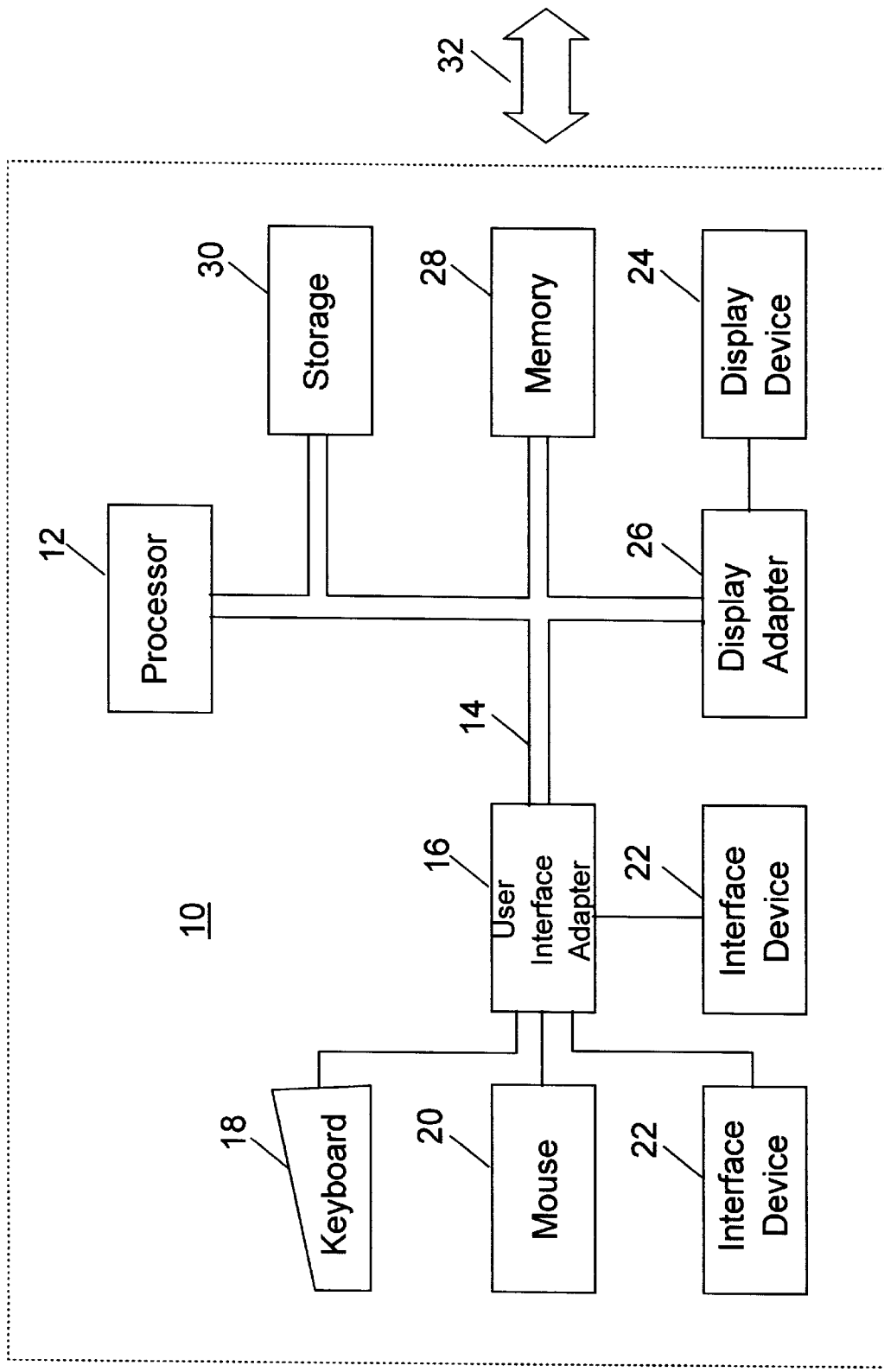
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
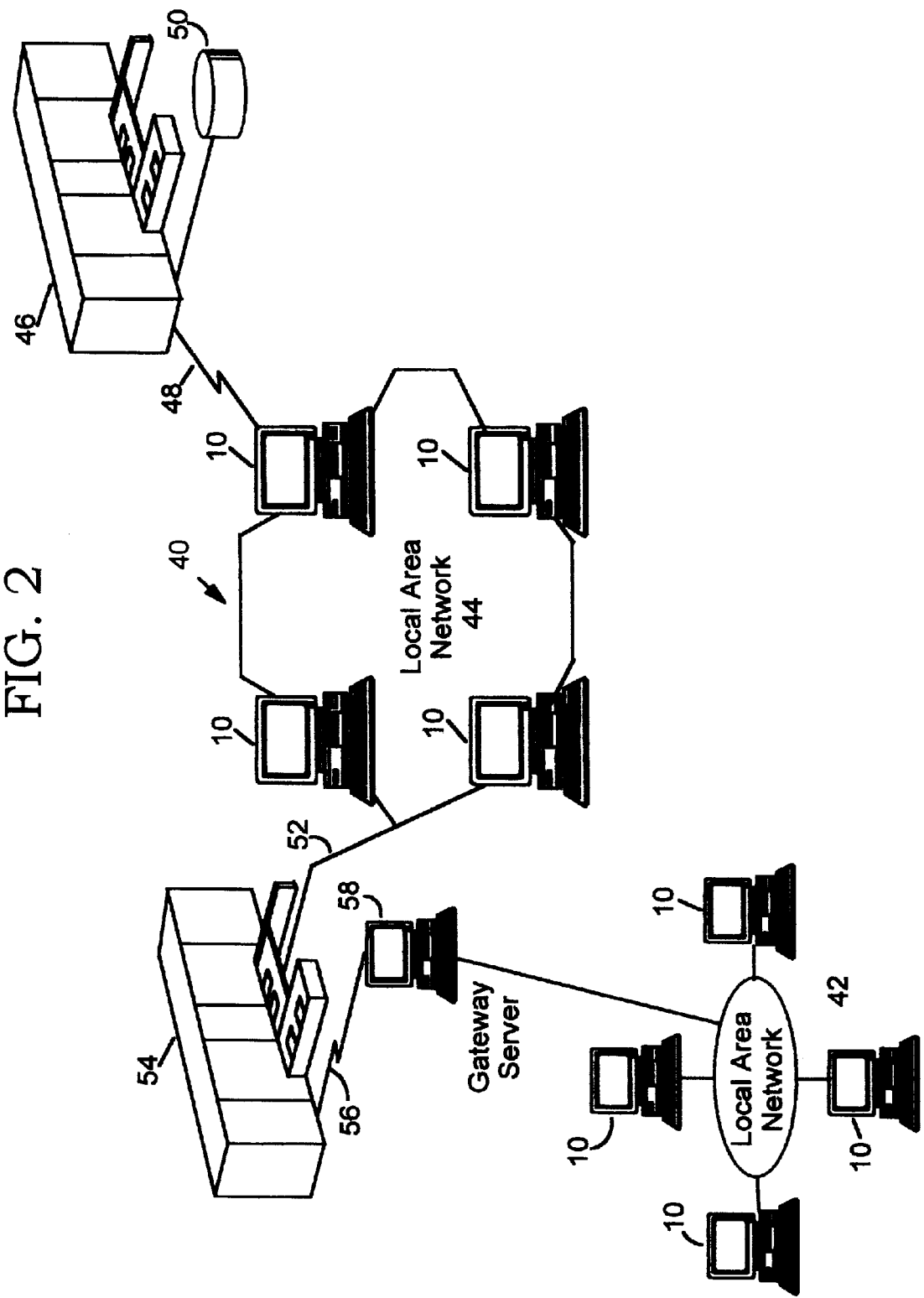
FIG. 2 is a diagram of a networked computing environment in which the present invention may be practiced.

FIG. 2 illustrates a data processing network 40 in which the present invention may be practiced. The data processing network 40 may include a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers or servers, such as a mainframe computer 46, which may be preferably coupled to the LAN 44 by means of a communications link 48. The mainframe computer 46 may be implemented utilizing an Enterprise Systems Architecture/370, an Enterprise Systems Architecture/390 computer available from IBM, etc. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The client-server environment in which the present invention may be used includes an Internet environment, or an intranet environment. Additionally, the present invention may be practiced in an environment structured according to a three-tiered architecture, whereby a client-server environment is extended by adding data repositories as a third tier (such that the server now occupies the middle tier).

The preferred embodiment of the present invention will now be discussed with reference to FIGS. 3 through 9.

In the preferred embodiment, the present invention is implemented as a computer software program. The program code of the preferred embodiment may be implemented as objects (classes and methods) in an object-oriented programming language such as Smalltalk, or as instructions in a conventional procedural programming language (such as the C programming language).

The performance analysis technique of the present invention presents information to the visual programmer in a manner that is familiar to him, using the same view (i.e. the parts and their connections are laid out in substantially the same visual manner) that the programmer used when he created the visual program being benchmarked. This view is augmented in a novel manner to present runtime performance data. Various approaches to presenting this augmented information are discussed in alternative embodiments hereinafter.

Figure 3A:
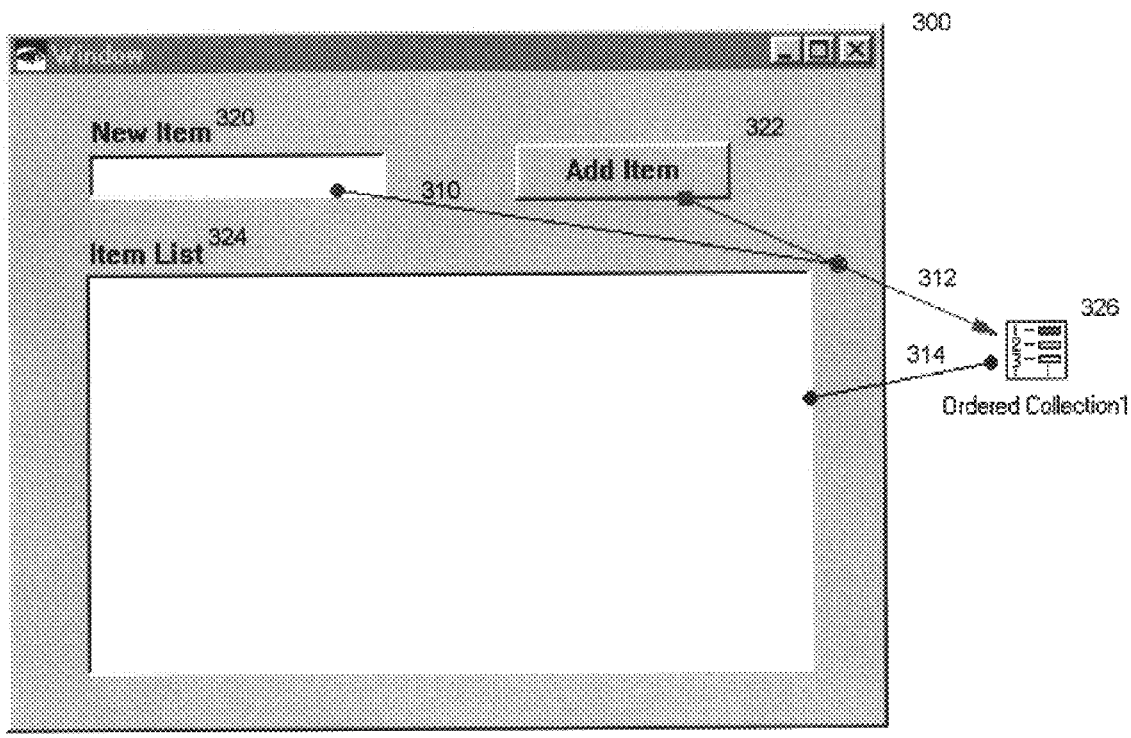
FIGS. 3A–3G illustrate a simple visually-created program that has been augmented with performance data according to alternative preferred embodiments of the present invention.

FIG. 3A shows a graphical representation 300 of a simple visually-created program which includes three connections 310, 312, 314. This visually-created program itself is a part, and includes four subparts 320, 322, 324, 326. Connection 310 is an attribute-to-attribute connection from the "New Item" part 320 to the event-to-action connection 312, which connects the "Add Item" pushbutton part 322 to the "Ordered Collection 1" part 326. Connection 314 is an attribute-to-attribute connection between the "Item List" part 324 and part 326. By connecting the "clicked" event (not shown) of the pushbutton 322's interface to the "add:" action (not shown) of the ordered collection 326's interface, the visual programmer has specified that when connection 312 fires, the corresponding event-to-action behavior occurs. In this example, the "add:" action requires a parameter, containing the element to be added to the ordered collection 326. The input parameter is obtained from input data that the end-user will enter using the entry field in new item part 320, which is then passed as a parameter of the connection 312. Connection 314 indicates that the items in the Ordered Collection 1 part 326 are displayed in the Item List part 324. Connection 314 is a bi-directional connection, so that a change in the Ordered Collection 1 part 326 will cause an update to the data displayed in the Item List part 324, and vice versa.

As discussed in the related invention titled "Visual Program Runtime Performance Analysis", a performance data collection technique for visual program performance data should express performance data in terms that are useful for the visual programmer. In a preferred embodiment of a performance data collection technique disclosed therein, execution of the following elements is monitored: connections, attributes, events, and actions. A stored representation of performance data is also discussed therein, whereby entries are stored for each element of interest, and each of the entries includes counters for the number of times the element was executed and the total elapsed time of this execution. An additional field may accumulate the number of bytes moved for elements which are attribute-to-attribute connections. Information stored in this manner (or in an equivalent thereto) is used by the present invention in order to show performance data by augmenting the programmer's view of the visual program.

Figure 3B:
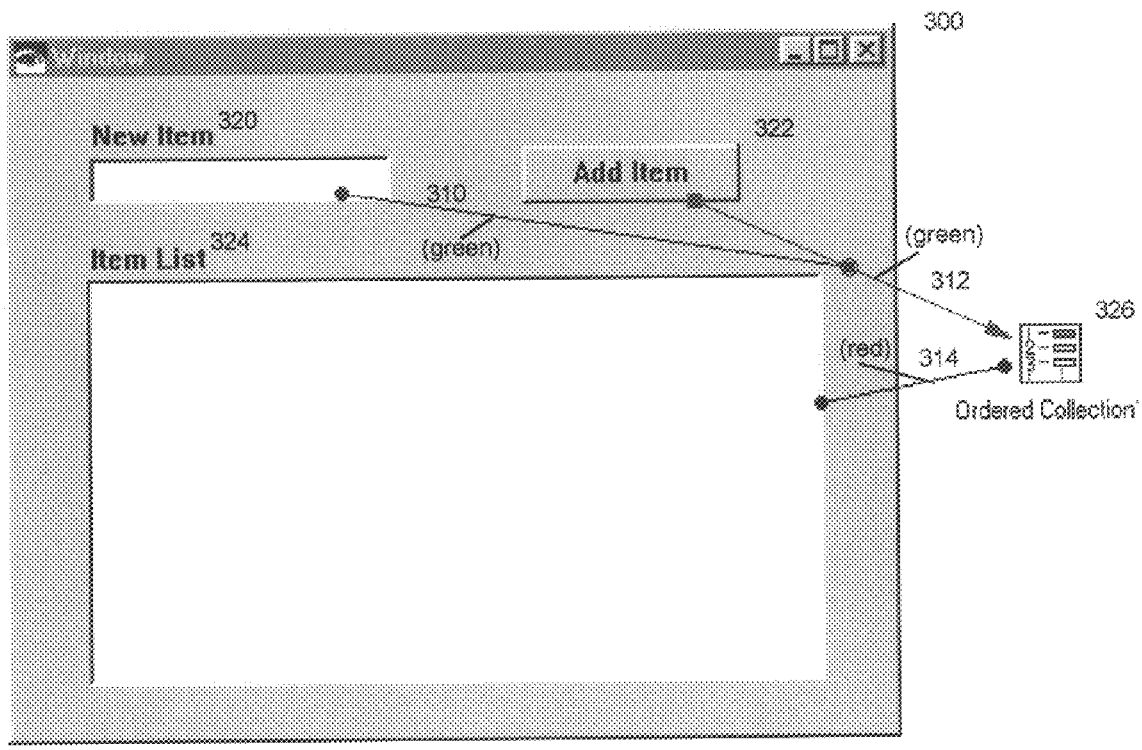
Figure 3C:
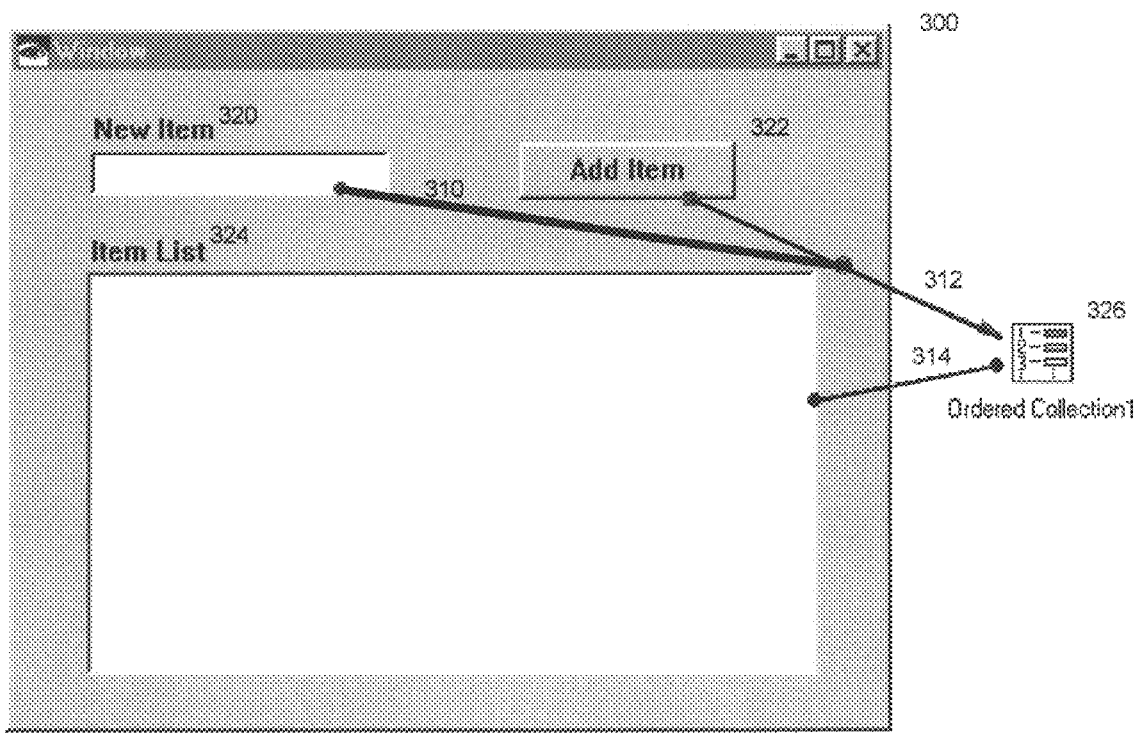
Figure 3D:
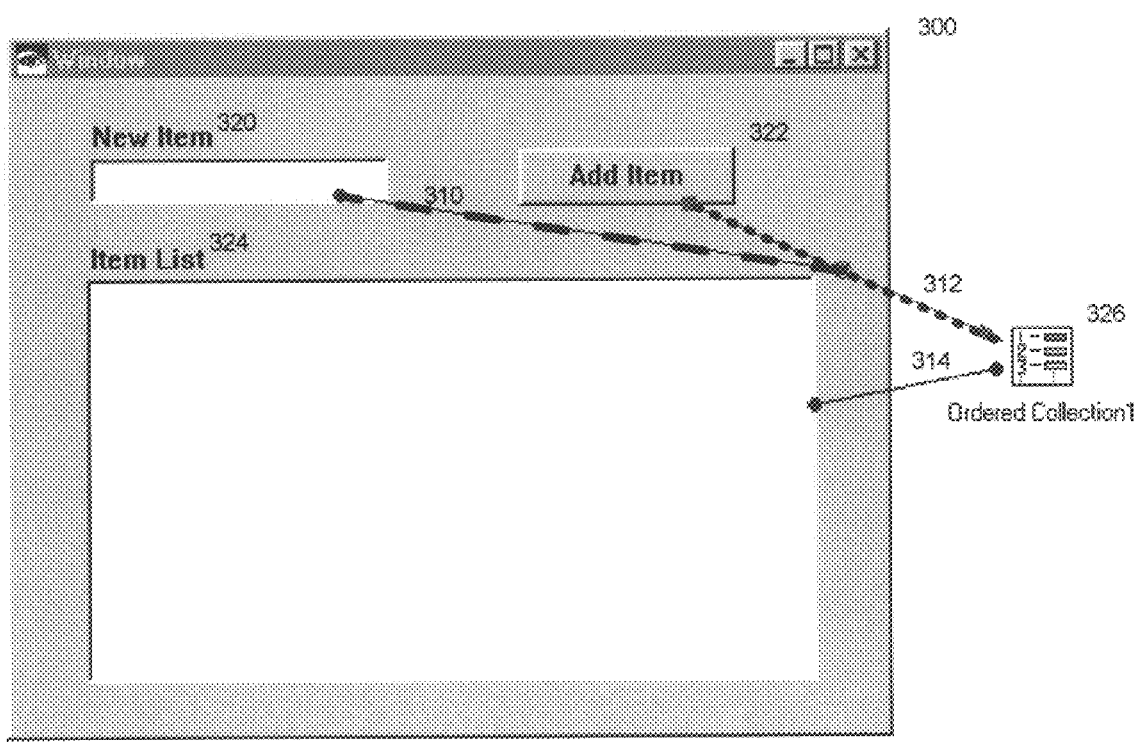
Figure 3E:
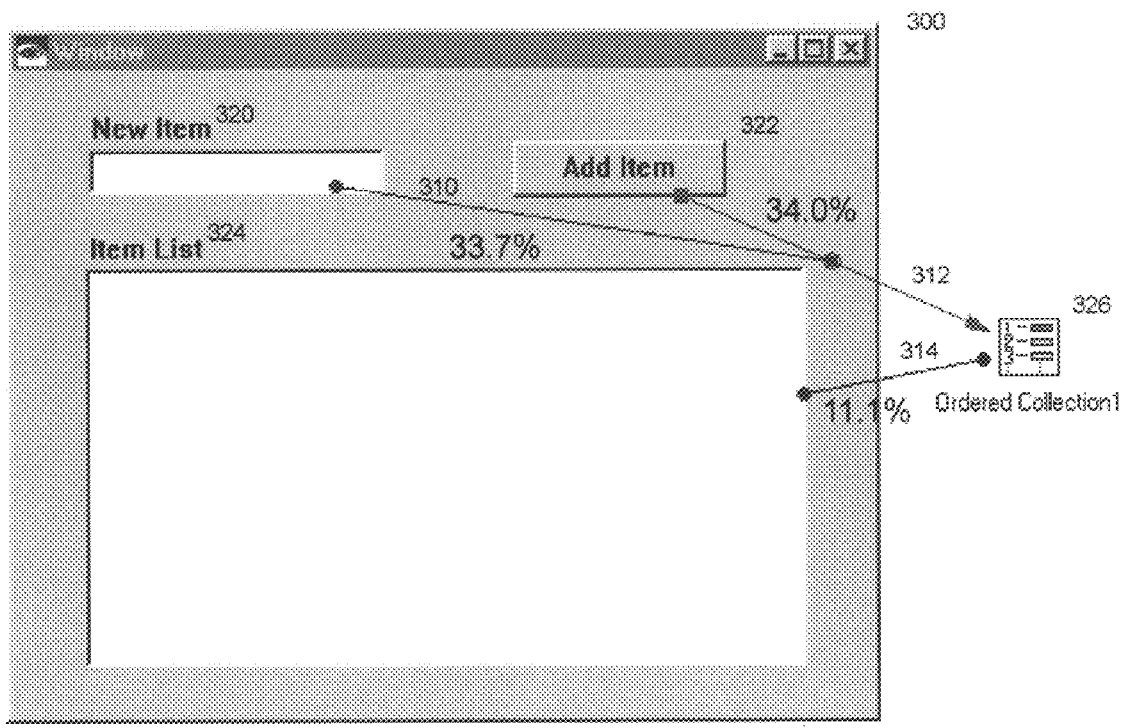
Figure 3F:
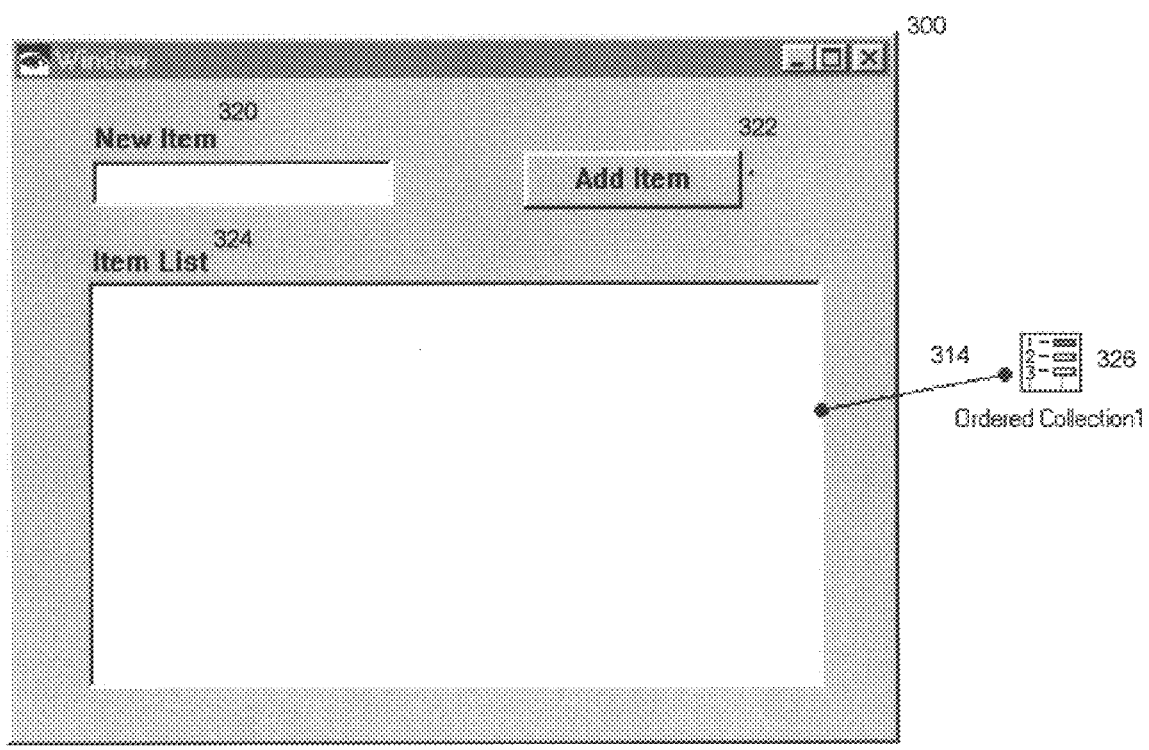
Figure 3G:
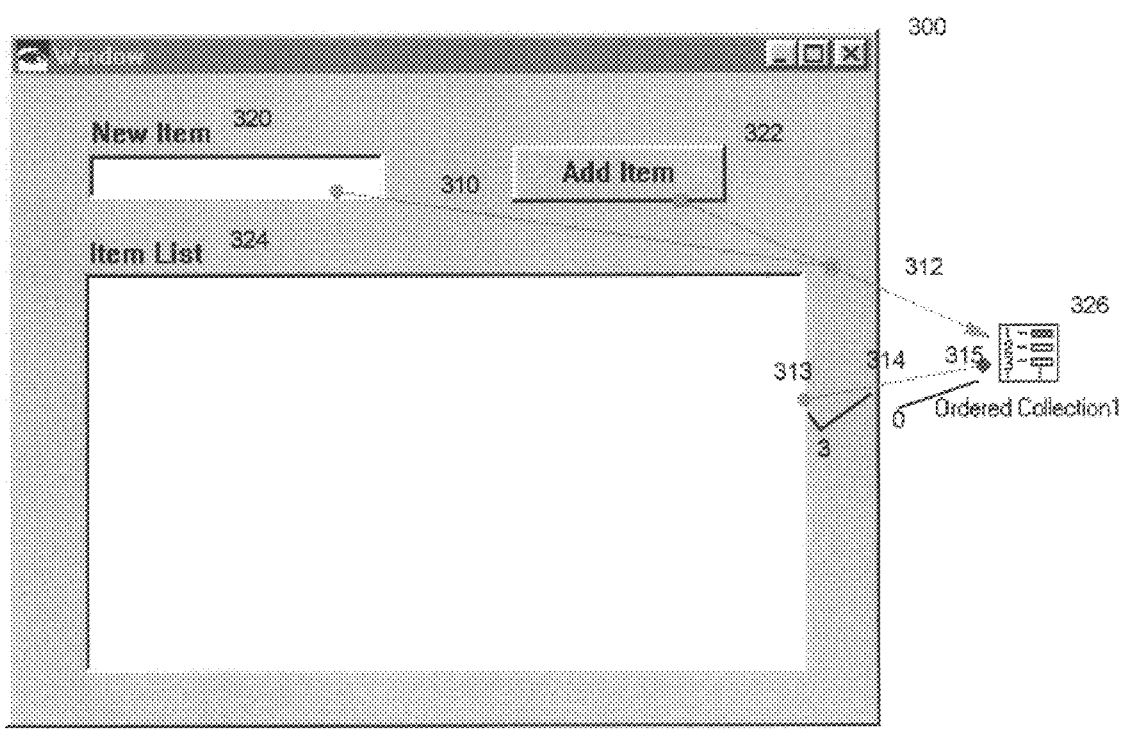
Figure 4:
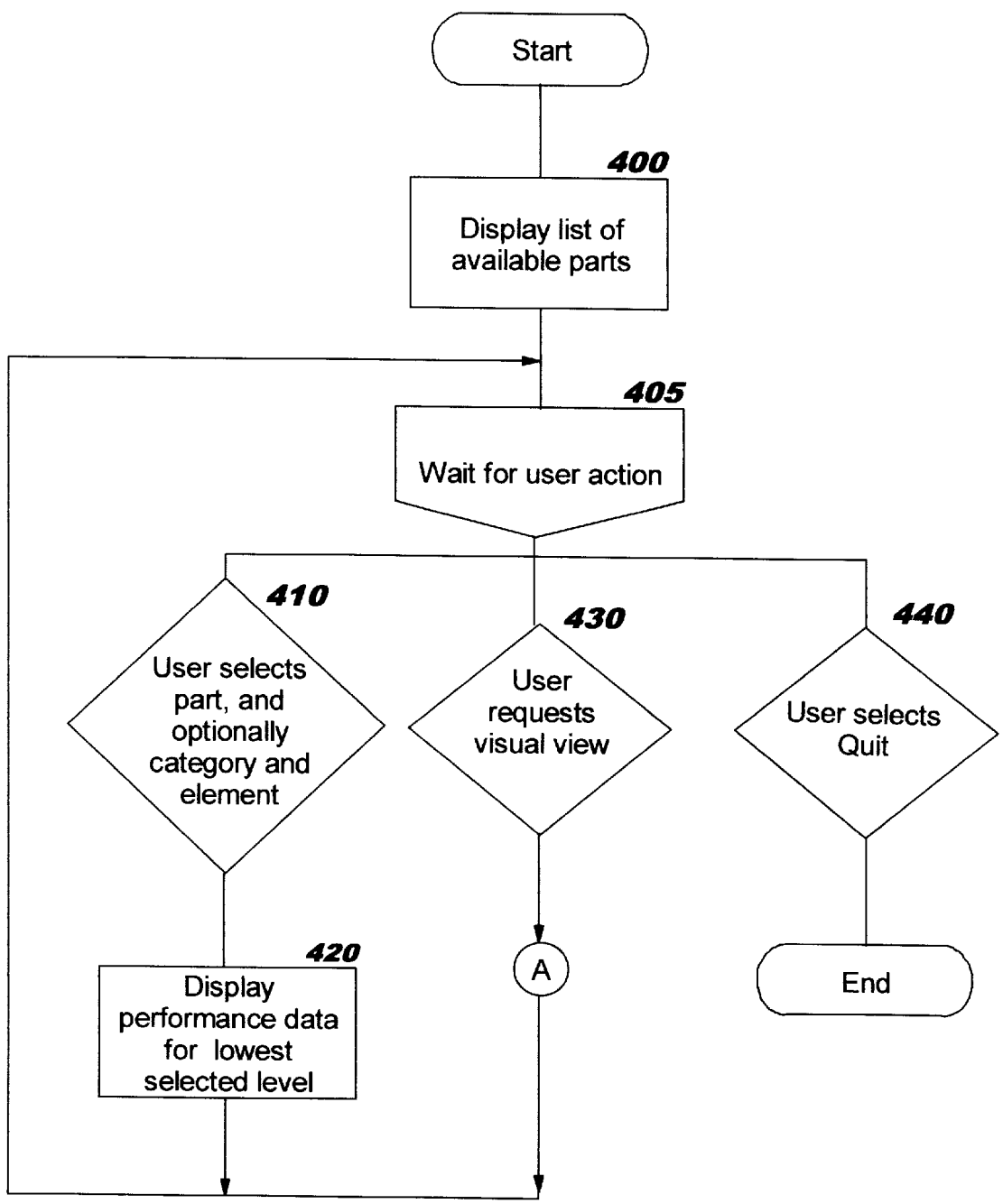
FIG. 4 illustrates a flowchart depicting a high-level flow of using the present invention to examine dynamic performance characteristics of program execution.

The technique with which performance data is presented will now be discussed with reference to FIGS. 4 through 6, making reference to alternative presentation approaches illustrated in FIGS. 3B–3G and FIG. 7.

Figure 7:
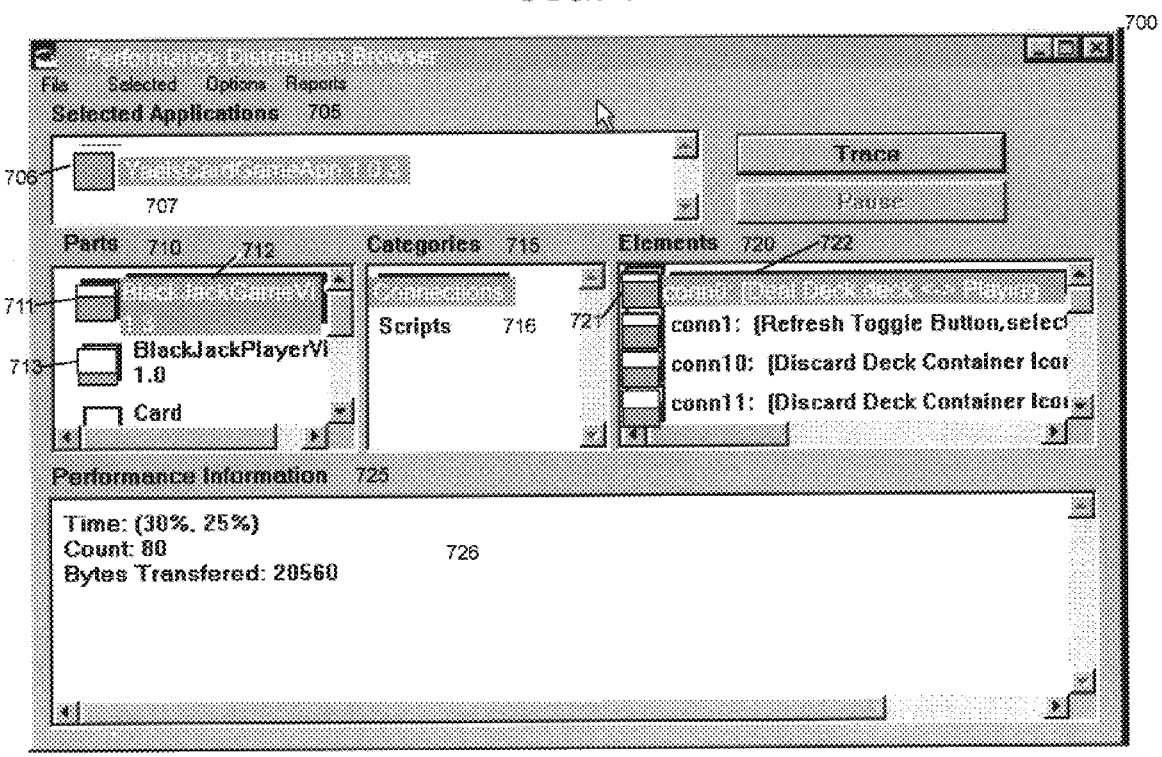
FIG. 7 illustrates an example of a hierarchical summary view that may be used to present performance data.

Visually-created programs may have both visual and non-visual aspects. The visual aspects are created using a visual editor, and include subparts and the connections between them. Non-visual aspects, on the other hand, are created with other types of editors (such as an interface browser or a code browser), and include the actions, events, and attributes which comprise a part's interface. According to the preferred embodiment of the present invention, performance data for the visual aspects is displayed in substantially the same view in which the programmer created the parts, while performance data for non-visual aspects is displayed using a hierarchical summary view that resembles a conventional code browser. FIGS. 3B through 3G illustrate examples of performance data using a visual view, and FIG. 7 shows performance data in the summary view. These figures will be discussed in more detail herein. These presentation styles are by way of example only, and are not meant to limit the present invention.

The presentation of runtime performance data begins at Block 400, where a list is presented to the user. This list contains the programs, or parts, for which the user can request to see performance data. The manner in which the list is presented does not form part of the present invention, and uses techniques which are known in the art. FIG. 7 shows one way in which this list may be presented, where a browser 700 has an "Applications" pane 705 where application names are displayed. Note that in this example, a hierarchical application structure is used where applications are comprised of parts, as shown in the "Parts" pane 710. This structure is not required, in which case the Applications pane 705 may be omitted.

Block 405 indicates that the implementation waits for user action. Blocks 410, 430, and 440 account for specific types of user input which are of significance to the present invention.

Block 410 indicates that the user selects the items for which he wishes to see performance data. Using the hierarchical layout of browser 700, the selection may include an application, a part, a category (from the "Categories" pane 715), and an element (from the "Elements" pane 720). Or, he may select only an application, an application and one of its parts, or an application, one of its parts, and a category within that part.

Block 420 indicates that performance data will be displayed for the user's selection, where detailed information is presented for the lowest-level item selected. In the preferred embodiment, these performance data comprise a summary visual indicator for each selected level such as the bar icons 706, 711, and 721, as well as the detailed information 726 presented in the "Performance Information" pane 725.

Each bar icon at the summary level indicates a range into which the corresponding item belongs. As shown by the completely solid pattern of bar icon 706, 100 percent of the current performance measure is attributable to execution of application 707. Bar icon 711, on the other hand, is less than completely filled. This visually indicates that part 712 accounts for something less than 100 percent of the current performance measure. Different types or styles of bar icons can be used to indicate different performance measures. For example, one type may be used for execution count, which uses a first color for the icon. Another type may be used for total time, using a second color, and similarly for local time. A facility (such as a pop-up or pull-down menu, or function key) may be provided to allow the user to select which particular performance measure he wants to see, which will cause the icon type to change. The icon types may alternatively be distinguished in other ways than with use of different colors, such as with use of different borders. Ranges may be used with the performance measures, as further discussed below with reference to Block 670. In that situation, one icon appearance of each type may indicate that one of the defined ranges is applicable for this item. For example, icon 706 may indicate "very high", while icon 711 indicates "high" and icon 713 indicates "low".

The detailed information displayed in pane 725 is preferably one or more lines of text explaining the performance data of the lowest-level item the user selected. In FIG. 7, the lowest-level item selected was the connection element identified as "conn0" at 722 (where selection has been indicated by highlighting). Thus, the detailed information 726 explains that this connection had a total execution time corresponding to 30 percent of the total program execution, a local execution time corresponding to 25 percent of the total, an execution count of 80, and that 20,560 bytes were transferred during these executions. Optionally, the average total (or local) execution time can also be displayed by dividing the total (or local) execution time by the number of times the connection executed. Similar information will be presented when the lowest-level selected item is an element from one of the other categories. When it is a bidirectional attribute-to-attribute connection, the text may indicate this execution information for both directions together, or for each direction separately. Further, the amount of data moved may be indicated, as has been shown in the example at 726.

Additionally, the percentage of execution counts, compared to the total number for the program as a whole may be computed and displayed in the Performance Information pane 725. Alternatively, instead of comparing this element to the entire program, it may be compared to the execution counts of all elements in the same category (e.g., whereby a selected connection is compared to all connections for this program). As a further option, it may be desirable to indicate the total and local execution time in actual units of time, instead of or in addition to the percentages as shown in pane 726.

When the items are displayed for analyzing their performance data (using, for example, the list panes shown in FIG. 7), they are typically sorted according to their descending local time. This enables the user to focus on the elements that represent a significant amount of execution time, so that these elements may be studied to determine whether they are performing optimally. Alternatively, they may be sorted according to other performance criteria (such as total time or execution count), or they may be displayed in alphabetical order by item name. The order of sorting may be specified by the user (for example, using a "Preferences" option to configure the implementation, by selecting a sort order from a menu, etc.).

Block 430 is reached when the user has requested to open a visual view on a selected part, or on a part containing a selected connection. This request may be made using known techniques, such as double-clicking on a part or connection entry, popping up (or pulling down) a menu which has a selectable option for opening a visual view, pressing a function key corresponding to this function, etc. The process shown in FIG. 5 (and described in detail below) is preferably used to build and display the visual view.

Figure 5:
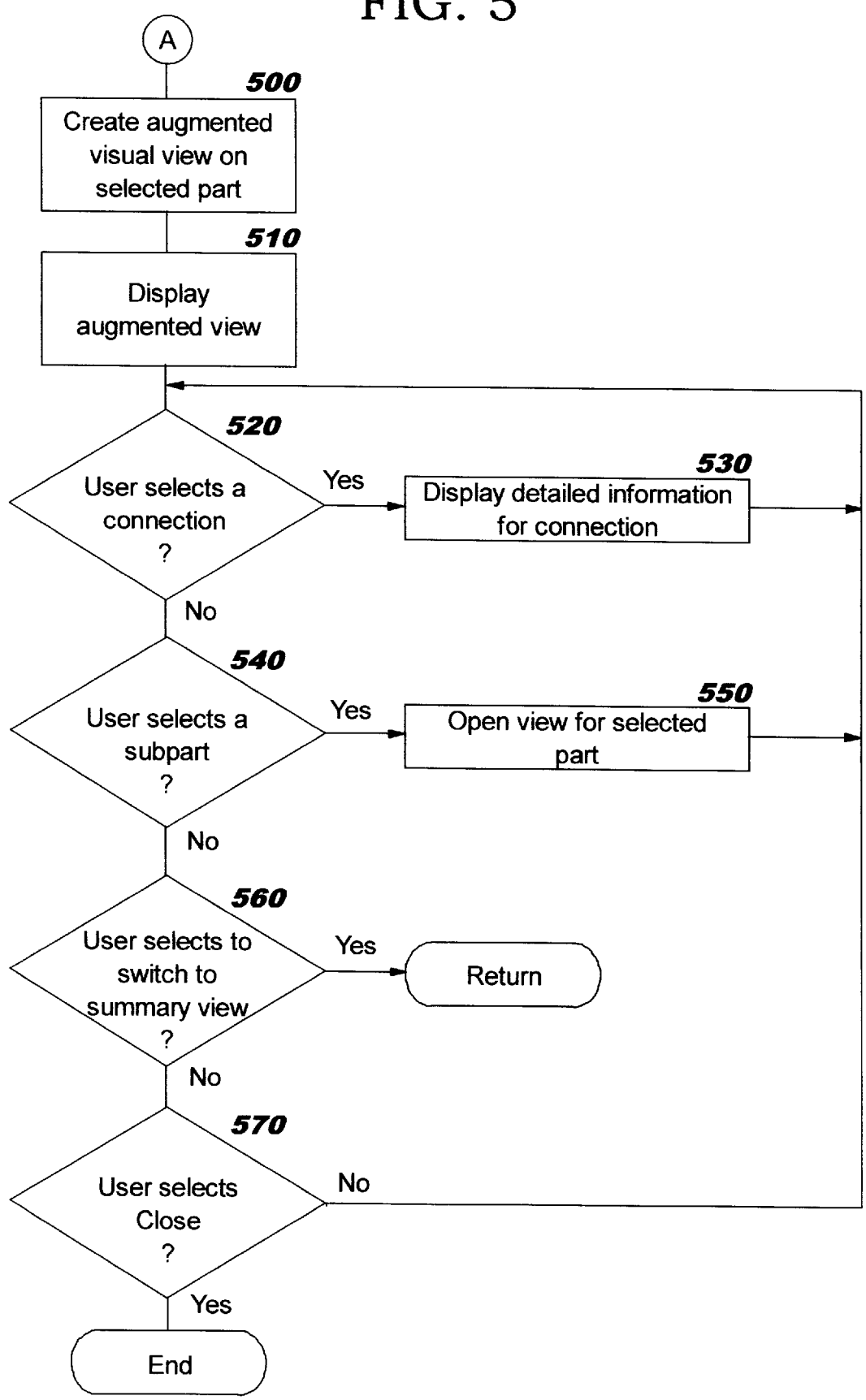
FIG. 5 illustrates a flowchart depicting logic that may be used in a preferred embodiment to create a visual view of performance data.

Following the processing of Block 420, or completion of the process of FIG. 5 which is invoked after Block 430, control returns to Block 405 to await the user's next selection.

Block 440 is reached when the user has requested to "Quit". The processing of FIG. 4 then ends.

FIG. 5 illustrates the process of using a visual view for a selected part, according to the preferred embodiment. Block 500 creates the augmented visual view for the part selected by the user in Block 410 (or the part containing the selected connection, when applicable), using the same view the programmer used when the visual program was created. When the phrase "the same view" is used herein, it is meant that the layout of the visual elements is substantially the same. However, use of the present invention necessarily requires some visual changes to convey the augmented information. For example, different colors or additional text may be used to indicate performance data for connections. These changes are discussed below with reference to the alternative aspects of the preferred embodiment. The manner in which the augmented view is created is described in more detail in FIG. 6.

At Block 510, the augmented visual view is displayed, showing the performance data which is applicable to this view. The user may then select elements from this augmented view, to request display of additional information and to navigate to other views. Blocks 520 and 540 represent this selection capability.

Block 520 asks whether the user has clicked on (or otherwise indicated selection of) a connection of the displayed visual view. If this test has a negative response, control transfers to Block 540. Otherwise, Block 530 displays more detailed information for this connection. In the preferred embodiment, this comprises displaying one or more lines of text such as the detailed information 726 described above with reference to pane 725 of FIG. 7 (which includes this connection's percentage of total and/or local program execution, execution count, and optionally byte transfer count). The control flow of FIG. 5 then indicates returning to Block 520, to await the user's next selection.

Figure 8:
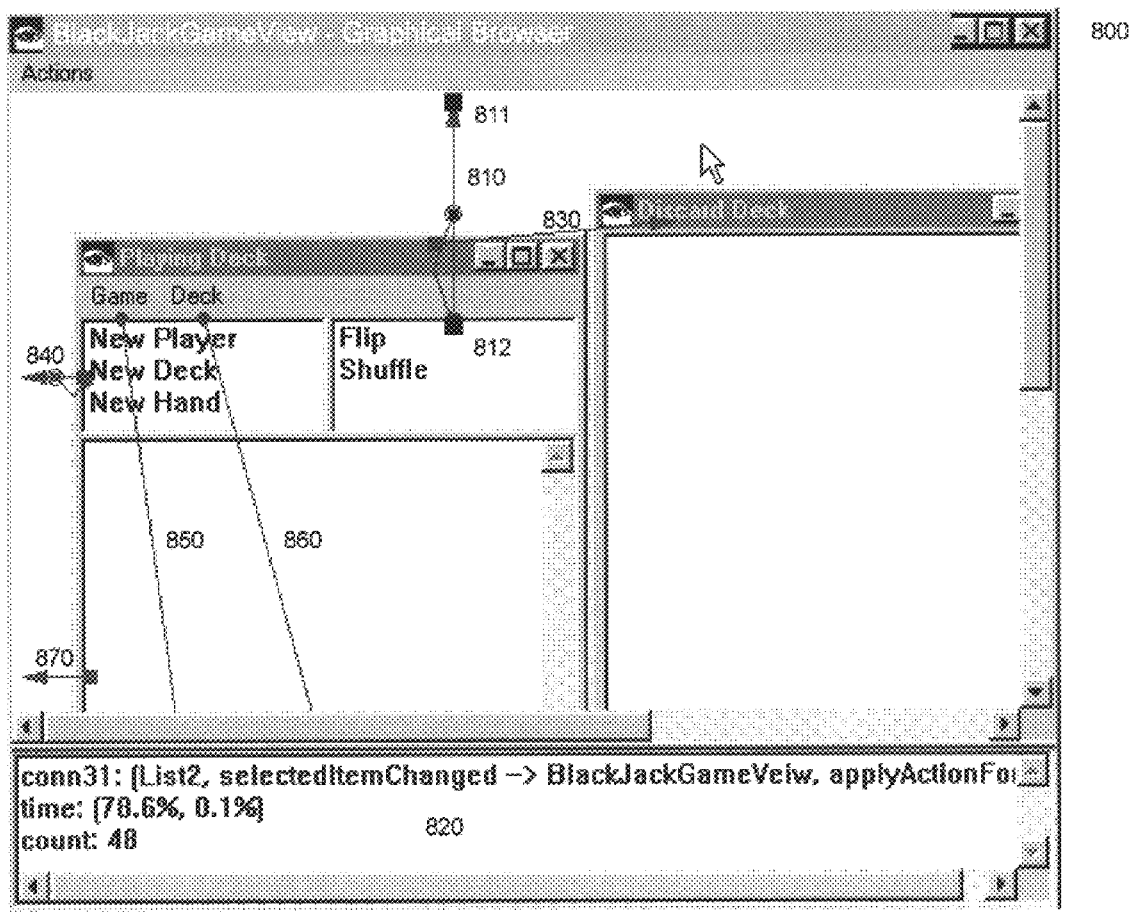
FIG. 8 shows an augmented view that has been displayed in a graphical browser for the example shown in FIG. 7.

FIG. 8 shows an example of an augmented view that has been displayed in a graphical browser 800 for the application shown in the hierarchical summary view of FIG. 7. A connection 810 has been selected at Block 520, as indicated by the presence of square selection indicators 811 and 812. Block 530 then causes the text 820 to be displayed, indicating firing data for this connection. Similar information may be displayed for the other connections 830, 840, 850, 860, and 870 by selecting their graphical representation.

Figure 9:
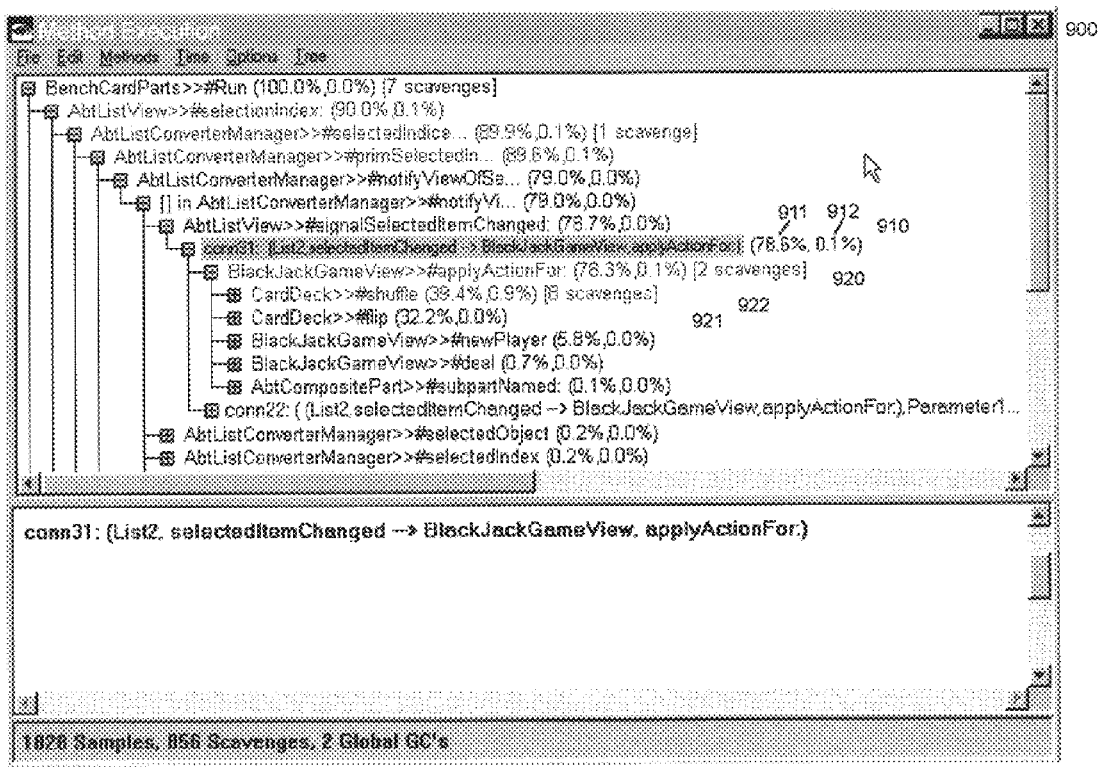
FIG. 9 illustrates a method execution window that may be displayed, showing the calls-called execution for the example shown in FIG. 7.

In addition, a calls-called execution tree may be displayed, such as shown in FIG. 9. FIG. 9 shows a tree view 905 in a method execution window 900. This example corresponds to the application shown in FIGS. 7 and 8, depicting the sequence of methods that were called during execution of the benchmark, and which methods called them. Each entry in this sequence, such as entries 910 and 920, includes an indication of the percentage of total execution time 911, 921 and local execution time 912, 922 for the corresponding entry.

Providing multiple views of the program in this manner enables quick and convenient navigation while analyzing performance. The augmented view displayed in graphical browser 800 is fully integrated with the other conventional views 700 and 900. This integration enables navigation from the graphical browser to the other views, from those views to the graphical browser, and between those views 700 and 900, while keeping the selected connection synchronized between all the views. For example, a connection such as "conn31" can be selected from the Elements pane 720. This causes the tree view 900 to expand in order to show the first place where that connection was invoked. In FIG. 9, entry 910 for "conn31" is shown as having been selected (where selection is indicated with use of highlighting). Selecting a connection in this manner from view 700 also causes the part containing the connection to be displayed (with the connection shown therein as selected) in the visual view pane 800. In this example, connection 810, which corresponds to the "conn31" identifier, is shown as being selected. Alternatively, the user may select this same connection using the graphical browser 800, by clicking on its graphical representation 810. In that case, FIG. 7 will highlight this connection's entry 722 in the Elements pane 720, and FIG. 9 will highlight its first invocation 910. Or, the user may select the connection's invocation 910 from the tree view 900, which will cause synchronized selection of the connection's entry 722 and its graphical representation 810.

Use of this navigation capability enables effectively and efficiently analyzing performance. Using the example shown in FIGS. 7–9, the performance information for entry 910 indicates that the total time 911 for this connection is 78.6 percent, while the local time 912 is only 0.1 percent. This tells the user that while a great deal of time is spent in executing the connection, that time is actually related to the called code, and not the local execution time of the connection itself. To find out where the performance bottleneck is, the user must then analyze the code that is invoked for this connection. Or, to see other places where the selected item is invoked, the user may again click on the item's entry in pane 720 or its graphical representation 810, causing the tree view 900 to display the next invocation as being selected.

Block 540 asks whether the user has selected a subpart of the displayed visual view. If this test has a negative response, control transfers to Block 560. Otherwise, Block 550 opens a view for this subpart. This view will differ depending on the type of subpart selected. Control then returns to Block 520. Alternatively, there may be no further information provided for subparts in the visual view. In that case, the processes of Blocks 540 and 550 may be omitted.

Block 560 asks whether the user has requested to return to the summary view. If not, processing continues to Block 570. Otherwise, control returns to the process of FIG. 4 (following Block 420).

At Block 570, a test is made to determine whether the user has selected to close this visual view. If this test has a positive response, the process of FIG. 5 ends. Otherwise, the user may have made a selection which is not pertinent to the present invention, and control returns to Block 520 to await the user's next selection.

Figure 6:
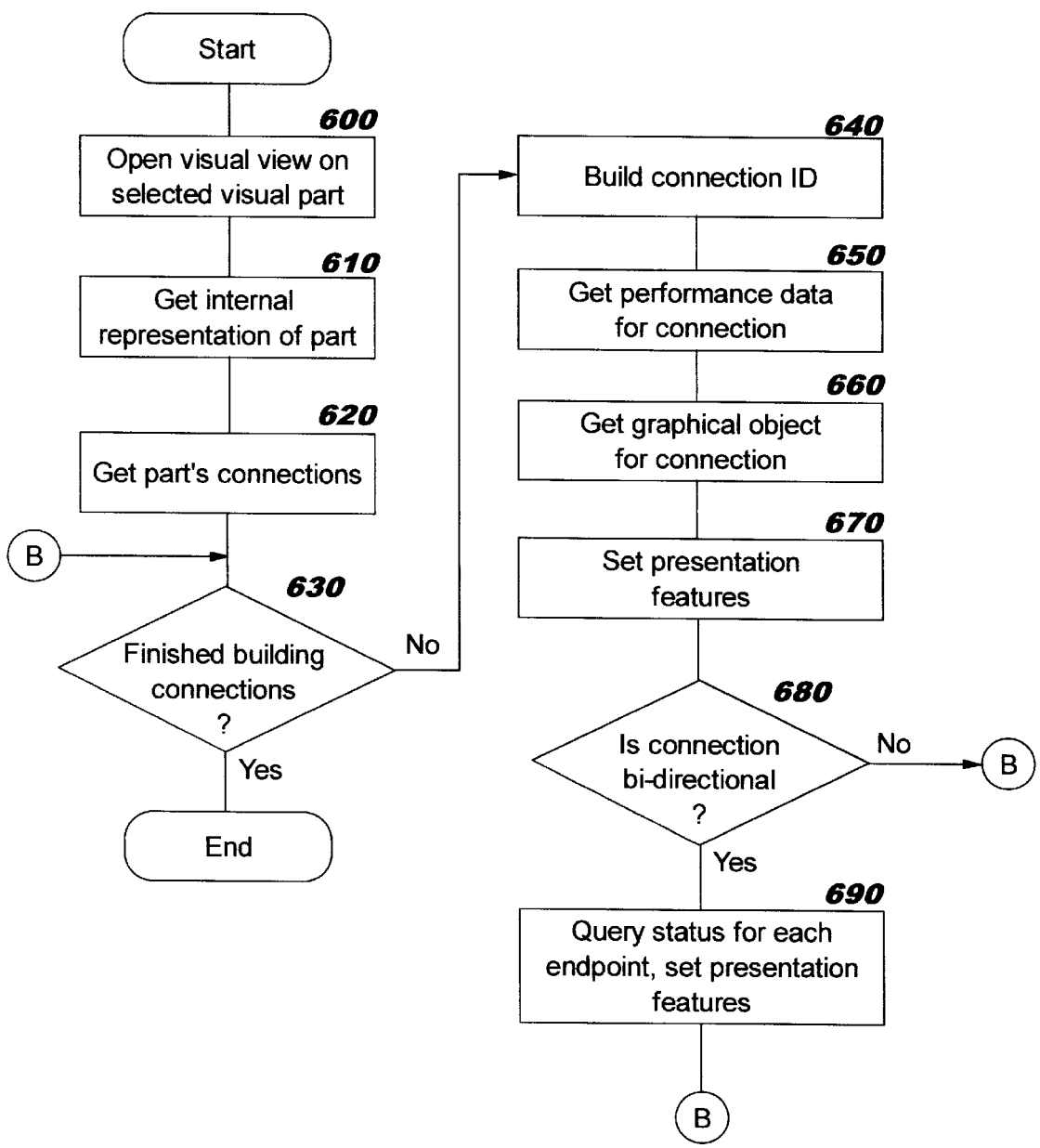
FIG. 6 illustrates a flowchart that expands on the level of detail in FIG. 5, describing the implementation of a preferred embodiment of creating an augmented visual view.

FIG. 6 expands on the level of detail shown for Block 500 of Fig. 5, and illustrates the process of creating a visual view of a part, where the part's connections are visually augmented with performance data.

At Block 600, the preferred embodiment opens a visual view on the selected visual part. Block 610 gets the internal representation of this part. This is done by sending a message such as "returnPart" or "getPart", using the specific message that has been provided by the visual programming environment in which the present invention is embodied.

Block 620 then gets this part's connections, again using a message such as "returnConnections" which is part of the visual programming environment. Each of these connections is then processed according to the logic of Blocks 640 through 690. Block 630 tests to see if processing all the part's connections is finished, and if so, the process of FIG. 6 ends.

Block 640 builds a connection identifier (referred to equivalently as a "connection ID") for this connection, which is preferably stored with the internal representation of the visual part. This may be done, for example, by sending a message such as "getID" to the connection object. The connection ID is then used in Block 650 to get the performance data for this connection. When the performance data has been stored in a multi-dimensional array or Smalltalk dictionary, as discussed in the related invention titled "Visual Program Runtime Performance Analysis", the status can be retrieved using the connection ID as an index to the array or dictionary, and returning the performance data values of the corresponding entry.

Block 660 obtains the graphical object for this connection, which is stored with the internal representation of the visual part. Block 670 then augments this graphical object to visually convey performance data by setting the appropriate presentation features of the object. The particular manner of conveying this status information may be predefined for an embodiment of the present invention, or a facility may be provided to enable a user to select the approach they prefer (e.g. by using a pull-down menu such as "Preferences", a pop-up menu, a configuration option, etc.).

The retrieved performance data for this connection is used when setting the presentation features of the object. A number of alternative techniques may be used, such as color, line style, textual annotation, etc., as discussed below. The specific presentation feature to be used on an element depends on criteria which must be either predefined for an implementation, or configured by a user. The preset criteria will specify one or more threshhold values, or range divisions (preferably as a percentage, since a comparison to a particular count or time value may not be useful). For example, it may be desirable to use green font for presenting connections which have been executed a relatively low number of times (or relatively low percentage of total execution), and red font for those which have been executed a relatively high number of times (or relatively high percentage of total execution). In that case, the preset criteria may comprise a single percentage which is to be used as the cutoff between "relatively high" and "relatively low". The following pseudocode represents coding that might be used in an implementation of the present invention with a single criteria of this type, where this single value is stored in a variable which is referred to as "warning-level":

If (amount-of-execution<warning-level)
  Then connection-color:=green
Else
  connection-color:=red;

In an object-oriented environment, setting the connection's color may be achieved by sending a message to the object corresponding to the graphical representation of the connection, where the message may take a form such as "color:green".

Alternatively, more than one value may be used to divide a range into categories such as low, medium, and high, including further refinements of these categories (e.g. very low, low, medium, high, and very high). A numeric value must be associated with the boundary of each of these categories, in order to determine where the selected element belongs. The range divisions may be predefined for an implementation, or a facility may be provided (e.g., as a configuration option, or using a menu during operation of the embodiment) to allow the user to specify the numeric values for the boundaries. The process of determining into which category an item falls uses techniques which are well known to one of ordinary skill in the art, such as using a SELECT statement or an IF statement (which may contain nested IF clauses).

In one aspect of the preferred embodiment, one color is used for connections that have been fired more than a specified percentage of the total firings (or more than a specific number of times), or executed for more than a specified percentage of the total execution time. A different color is used for those connections firing (or executing) less than this percentage. An example of this use of color is illustrated in FIG. 3B, where connections 310 and 312 are parenthetically marked to show that they would be displayed using green (indicating these connections were fired more than the threshhold value), and connection 314 is parenthetically marked to show that it would be displayed using red (indicating that this connection fired less than the threshhold value). For the situation in which the percentage is equal to the threshhold value, an implementation may choose to associate that with the "less than" or with the "more than".

In another aspect of the preferred embodiment, a single color may be used, where varying hues or intensities are used to convey that the connection belongs in one range or another, as discussed above. Or, different colors may be used for each end of the range, with varying hues of the different colors used for intermediate divisions of the ranges.

In another aspect of the preferred embodiment, different line thicknesses may be used for connections, where the line thickness indicates the relative percent of firings or execution time. This is illustrated in FIG. 3C, showing connection 310 having the thickest line, connection 312 having a line of intermediate thickness, and connection 314 having a thin line. (Note that the user is expected to know which line thickness represents each category or range division.)

In yet another aspect of the preferred embodiment, different line styles may be used for connections. A first line style, such as lines having dashes of varying lengths, can be used to indicate connection firing and execution information. This is illustrated in FIG. 3D, showing connection 310 having a line with long dashes, connection 312 having a line with dashes of intermediate length, and connection 314 having a line with short dashes.

In another aspect of the preferred embodiment, the visual program may use the same (or substantially the same) graphical representations of connections that were used when the programmer created the program, where the augmentation is provided by textual annotations. This is illustrated in FIG. 3E, where connections 310, 312, and 314 each have text appearing nearby that specifies the percentage of execution time attributed to this connection. As indicated previously, this text could alternatively specify execution time as a specific number of units of time, or it could specify the execution count (again as either a percentage of total execution count, or as a specific number) instead of or in addition to the time information. In the preferred embodiment, the location for displaying the text is calculated as a small offset from the location of the corresponding connection (and this location may be obtained by sending a message to the connection, or otherwise querying stored location information).

In yet another aspect of the preferred embodiment, performance may be indicated by hiding connections from view which fall into a specified category or range, or below a specified threshhold. Then, the connections which are displayed are known to fall into other (non-hidden) ranges, or are above the threshhold. FIG. 3F illustrates this aspect, where connections 310 and 312 are no longer shown, while connection 314 is shown. This aspect may be useful for focusing the analysis on those connections meeting the specific "hide vs. display" criteria.

Block 680 asks whether this connection was bi-directional. If not, then control returns to Block 630 to process the next connection for this part. Otherwise, Block 690 queries the performance data for each endpoint of the connection. The visual presentation features of the endpoints of the connection object are then set accordingly. FIG. 3G illustrates an example of this, where bidirectional connection 314 is shown as being fired 3 times, endpoint 313 is also shown as being fired 3 times, and endpoint 315 is shown as being fired 0 times. This augmentation indicates that: (1) bidirectional connection 314 fired 3 times in total; (2) the direction of firing with Item List part 324 as the target, and Ordered Collection 1 part 326 as the source, for all 3 firings; and (3) the direction with part 324 as source and part 326 as target did not fire. Other techniques may be used for indicating coverage of endpoints, such as: arrowheads using degrees of a non-solid pattern; arrowheads accompanied by textual annotations; etc. Or, a separate arrow may be displayed for each direction, with an appropriate visual indicator for the performance data of each arrow.

When the bidirectional connection presentation features have been set, control returns to Block 630 to process the next connection for this part.

While the above visual characteristics provide several alternative ways of indicating performance data, other techniques may be used without deviating from the inventive concepts of the present invention.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing system having a capability for component-based visual programming, a computer program product for presenting runtime performance data, said computer program product embodied on a computer-readable medium readable by a computer in said computing system and comprising;

computer-readable program code means for providing one or more component-based, visually-constructed programs, wherein each of said visually-constructed programs comprises a plurality of components, one or more connections between selected ones of said components, and zero or more of; (1) events to be signaled by components; (2) actions to be performed by components; and (3) attributes of components;

computer-readable program code means for constructing a visual view of a selected one of said visually-constructed programs, wherein said visual view is substantially similar to a programming visual view used when constructing said selected visually-constructed program;

computer-readable program code means for displaying graphical representations of said components and said connections on said visual view; and computer-readable program code means for augmenting said constructed visual view to visually indicate said runtime performance data for selected ones of said connections.

2. The computer program product according to claim 1, wherein said visual indication further comprises using a first color for each of said selected connections having said runtime performance data in a first category, and one or more other colors for each of said selected connections having said runtime performance data in one or more other categories.

3. The computer program product according to claim 1, wherein said visual indication further comprises using a first line style for each of said selected connections having said runtime performance data in a first category, and one or more other line styles for each of said selected connections having said runtime performance data in one or more other categories.

4. The computer program product according to claim 1, wherein said visual indication further comprises using a first line thickness for each of said selected connections having said runtime performance data in a first category, and one or more other line thicknesses for each of said selected connections having said runtime performance data in one or more other categories.

5. The computer program product according to claim 1, wherein said visual indication further comprises using a first hidden status for each of said selected connections having said runtime performance data in a first category, and a second hidden status for each of said selected connections having said runtime performance data not in said first category.

6. The computer program product according to claim 1, wherein said visual indication further comprises annotating each of said selected connections with a textual indication of said runtime performance data.

7. The computer program product according to claim 1, wherein said runtime performance data is obtained from stored information containing indicators for each of said selected connections, wherein said stored indicators indicate a total execution time, a local execution time, and an execution count for said selected connection.

8. A system for presenting runtime performance data in a computing system having a capability for component-based visual programming, comprising:

one or more component-based, visually-constructed programs, wherein each of said visually-constructed programs comprises a plurality of components, one or more connections between selected ones of said components, and zero or more of: (1) events to be signaled by components (2) actions to be performed by components; and (3) attributes of components;

means for constructing a visual view of a selected one of said visually-constructed programs, wherein said visual view is substantially similar to a programming visual view used when constructing said selected visually-constructed program;

means for displaying graphical representations of said components and said connections on said visual view; and means for augmenting said constructed visual view to visually indicate said runtime performance data for selected ones of said connections.

9. The system according to claim 8, wherein said visual indication further comprises using a first color for each of said selected connections having said runtime performance data in a first category, and one or more other colors for each of said selected connections having said runtime performance data in one or more other categories.

10. The system according to claim 8, wherein said visual indication further comprises using a first line style for each of said selected connections having said runtime performance data in a first category, and one or more other line styles for each of said selected connections having said runtime performance data in one or more other categories.

11. The system according to claim 8, wherein said visual indication further comprises using a first line thickness for each of said selected connections having said runtime performance data in a first category, and one or more other line thicknesses for each of said selected connections having said runtime performance data in one or more other categories.

12. The system according to claim 8, wherein said visual indication further comprises using a first hidden status for each of said selected connections having said runtime performance data in a first category, and a second hidden status for each of said selected connections having said runtime performance data not in said first category.

13. The system according to claim 8, wherein said visual indication further comprises annotating each of said selected connections with a textual indication of said runtime performance data.

14. The system according to claim 8, wherein said runtime performance data is obtained from stored information containing indicators for each of said selected connections, wherein said stored indicators indicate a total execution time, a local execution time, and an execution count for said selected connection.

15. A method for presenting runtime performance data in a computing system having a capability for component-based visual programming, comprising the steps of:

constructing a view of a selected one of one or more component-based, visually-constructed programs, wherein each of said visually-constructed programs comprises a plurality of components, one or more connections between selected ones of said components, and zero or more of: (1) events to be signaled by components; (2) actions to be performed by components; and (3) attributes of components and wherein said visual view is substantially similar to a programming visual view used when constructing said selected visually-constructed;

displaying graphical representations of said components and said connections on said visual view; and augmenting said constructed visual view to visually indicate said runtime performance data for selected ones of said connections.

16. The method according to claim 15, wherein said visual indication further comprises using a first color for each of said selected connections having said runtime performance data in a first category, and one or more other colors for each of said selected connections having said runtime performance data in one or more other categories.

17. The method according to claim 15, wherein said visual indication further comprises using a first line style for each of said selected connections having said runtime performance data in a first category, and one or more other line styles for each of said selected connections having said runtime performance data in one or more other categories.

18. The method according to claim 15, wherein said visual indication further comprises using a first line thickness for each of said selected connections having said runtime performance data in a first category, and one or more other line thicknesses for each of said selected connections having said runtime performance data in one or more other categories.

19. The method according to claim 15, wherein said visual indication further comprises using a first hidden status for each of said selected connections having said runtime performance data in a first category, and a second hidden status for each of said selected connections having said runtime performance data not in said first category.

20. The method according to claim 15, wherein said visual indication further comprises annotating each of said selected connections with a textual indication of said runtime performance data.

21. The method according to claim 15, wherein said runtime performance data is obtained from stored information containing indicators for each of said selected connections, wherein said stored indicators indicate a total execution time, a local execution time, and an execution count for said selected connection.

22. The computer program product according to claim 7, wherein said stored indicators further comprise an amount of data moved when one of said selected connections fired, said one of said selected connections being an attribute-to-attribute connection.

23. The computer program product according to claim 1, further comprising computer-readable program code means for displaying said runtime performance data for said events, said actions, and said attributes in a hierarchical summary view.

24. The system according to claim 13, wherein said stored indicators further comprise an amount of data moved when one of said selected connections fired, said one of said selected connections being an attribute-to-attribute connection.

25. The system according to claim 8, further comprising means for displaying said runtime performance data for said events, said actions, and said attributes in a hierarchical summary view.

26. The method according to claim 21, wherein said stored indicators further comprise an amount of data moved when one of said selected connections fired, said one of said selected connections being an attribute-to-attribute connection.

27. The method according to claim 15, further comprising the step of displaying said runtime performance data for said events, said actions, and said attributes in a hierarchical summary view.

* * * * *